(No Model.) 2 Sheets—Sheet 1.
W. W. REID.
Table Tray and Meal Server.
No. 238,526. Patented March 8, 1881.
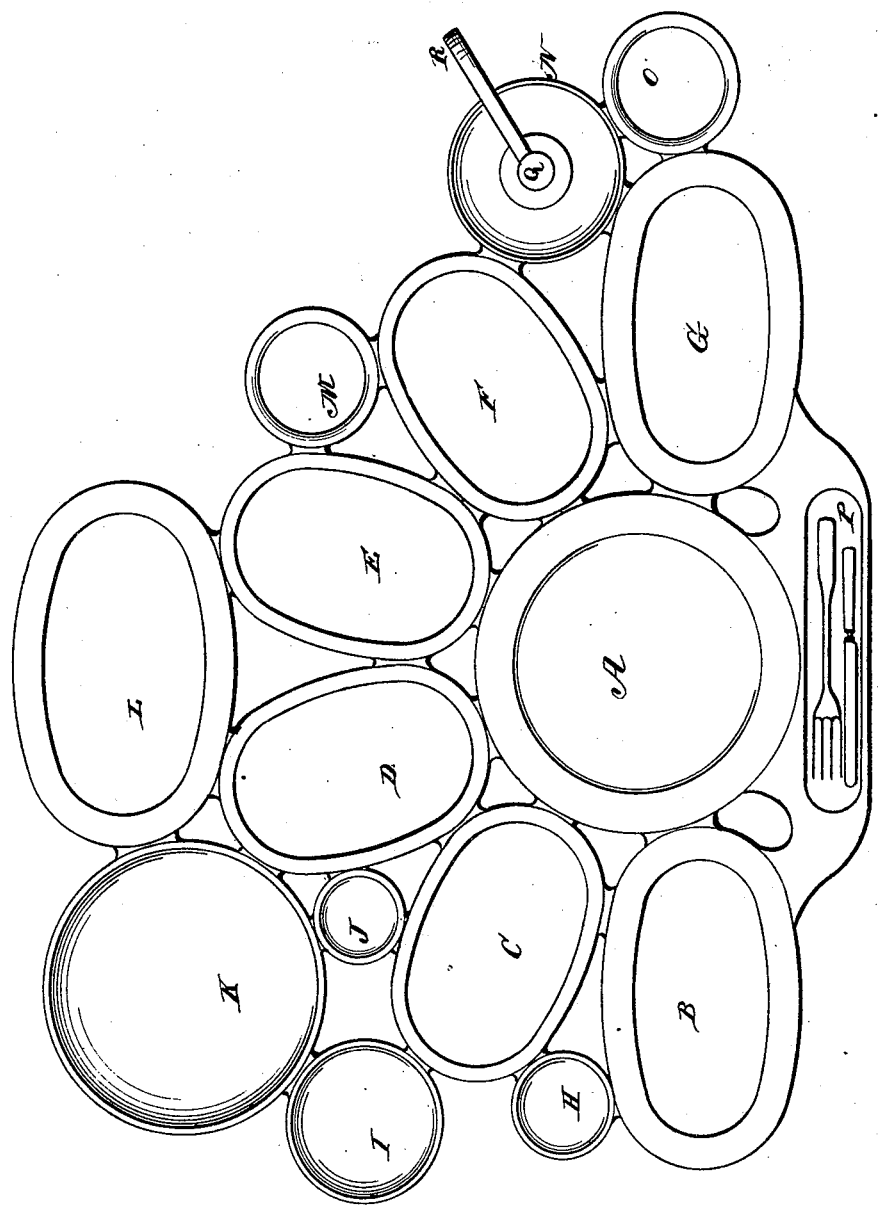
Witnesses.
Robert Everett
James J. Sheehy
Inventor.
Walter W. Reid.
J. Clement Smith.
Attorney.

(No Model.) 2 Sheets—Sheet 2.
W. W. REID.
Table Tray and Meal Server.
No. 238,526. Patented March 8, 1881.
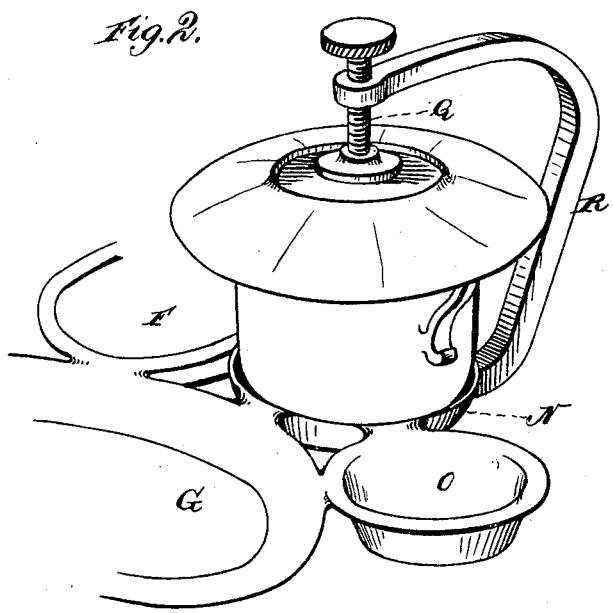
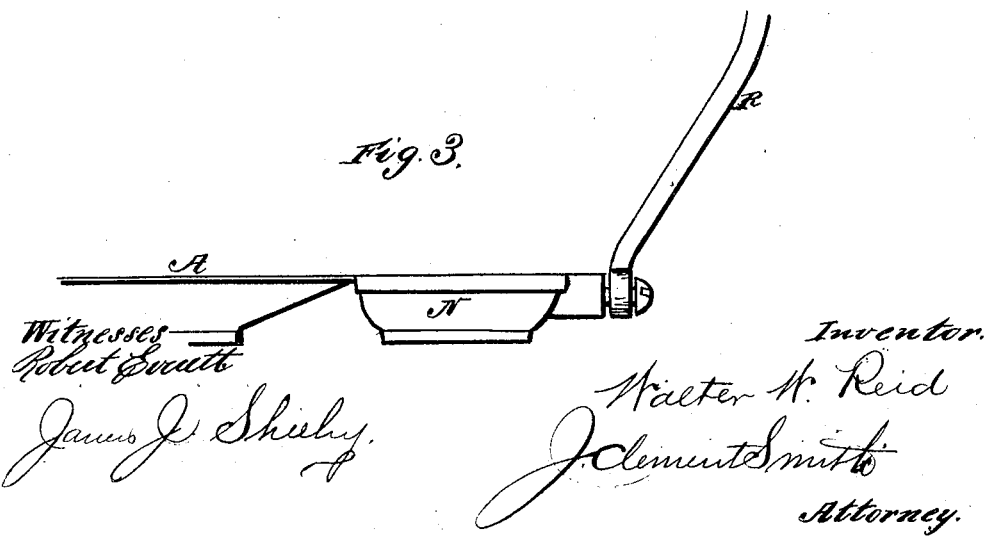

UNITED STATES PATENT OFFICE.

WALTER W. REID, OF BALTIMORE, MARYLAND.

TABLE-TRAY AND MEAL-SERVER.

SPECIFICATION forming part of Letters Patent No. 238,526, dated March 8, 1881.

Application filed August 4, 1880. (No model.)

*To all whom it may concern:*

Be it known that I, WALTER WILLIAMSON REID, a citizen of the United States, resident at Baltimore, in the county of Baltimore and State of Maryland, have invented certain new and useful Improvements in Table-Trays and Meal-Servers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to devices for serving meals at table; and it consists in the improved features of construction and combination hereinafter fully described, and particularly pointed out in the claim.

Figure 1 is a plan view of a device embodying the improvements in my invention, and Fig. 2 is an enlarged detail view of a portion of the same. Fig. 3 is an enlarged detail view of a modification.

The device is intended for family and hotel use, for placing a meal before the individual member of the family or the guest for whom it is intended.

In carrying out my invention I construct in wood, sheet metal, earthenware, or any other suitable material, a tray or server composed of a series of appropriate receptacles in the forms of the various dishes usually required to set a meal before a person, said receptacles or dishes being connected together to form a single piece of table-furniture for the reception of meats, vegetables, condiments, knife, fork, and spoon, cup and saucer, wine-bottle, and the like, said receptacles being arranged around another one which forms the plate from which the meal is to be eaten.

The receptacle designed for holding the cup has an arm, R, rising from one side thereof, curved outward, upward, and inward until its upper end comes over the center of the receptacle, where it is provided with a thumb-screw for clamping the inverted saucer upon the top of the cup, to prevent the contents of the latter from spilling out during transmission to the table, and also to keep the contents warm for a longer period of time than they would be were the cup left uncovered.

The knife and fork may be simply laid in a receptacle immediately in front of the plate, or they may be slipped in pockets secured to the tray.

Referring by letter to the drawings, A designates the plate, around which the receptacles or dishes B C D E F G H I J K L M N and the knife-and-fork receptacle P are arranged, as shown.

The arm R may be swiveled to the cup-receptacle to turn down when not in use.

The advantages of the device are apparent. The meal can be placed upon the tray or server, each receptacle receiving its appropriate portion, the cup of coffee or tea put in its receptacle, covered with the inverted saucer, and the screw Q turned down to hold them in place, and the meal placed upon the table before the person for whom it is intended. There is less time required in washing this device than washing the number of separate dishes represented by it, and, besides, several of the devices may be readily carried at one time.

I am aware that a dish comprising three or more food-receptacles, a holder for a cup or wine-glass, and a handle, and designed to be held in the hand of the user, is not new, but is shown in Patent No. 163,355, of May 18, 1875, and such an article I do not claim herein.

Having thus fully described my invention, what I claim as new, and desire to secure by Letters Patent, is—

As a new article of manufacture, the herein-described table-tray or meal-server for serving a complete meal, consisting of the plate A, around which is arranged a series of dish and other shaped receptacles for holding food, seasonings, knife, fork, and spoon, &c., and a cup-receptacle provided with a curved arm having a thumb-screw, connected or formed together to constitute a single article of table-furniture, substantially as set forth.

In testimony whereof I affix my signature in presence of two witnesses.

WALTER W. REID.

Witnesses:
  THEO. MUNGEN,
  JAMES J. SHEEHY.